United States Patent

[11] 3,580,316

[72] Inventor George V. Mastrapas
 660 Virginia Park, Detroit, Mich. 48202
[21] Appl. No. 789,792
[22] Filed Jan. 8, 1969
[45] Patented May 25, 1971

[54] REINFORCED TIRE
 18 Claims, 6 Drawing Figs.
[52] U.S. Cl. ................................................ 152/200, 152/207
[51] Int. Cl. ....................................................... B60c 19/12
[50] Field of Search........................................... 152/207, 169, 190, 192—4, 57, 200

[56] References Cited
 UNITED STATES PATENTS
 551,953  12/1895  Gaston .......................... 152/207
 624,763  5/1899   Downing ....................... 152/57
 692,446  2/1902   Hopkinson ..................... 152/207X
 1,228,001 5/1917  Demas........................... 152/200X
 1,399,556 12/1921 Hill................................ 152/199X
 1,487,623 3/1924  Thompson...................... 152/200X Primary Examiner—Arthur L. LaPoint
Assistant Examiner—George H. Libman
Attorney—David A. Maxon ABSTRACT: This invention relates to a reinforced tire. A thin steel sheet is wrapped radially interior to the tread. Rivets fixed to the sheet extend radially outward therefrom into the tread rubber. An array of indentations is provided on the sheet. Rubber adhering glue fixes the sheet to the tread rubber and more radially interior tire rubber. Brackets integral with the sheet and angularly displaced with respect thereto provide additional securing means between the sheet and the rubber of the tire.

PATENTED MAY 25 1971

INVENTOR
GEORGE V. MASTRAPAS

BY David A. Maxon
ATTORNEY

INVENTOR
GEORGE V. MASTRAPAS

BY

ATTORNEY

3,580,316

REINFORCED TIRE

This invention relates generally to a reinforced tire. More particularly, this invention relates to a reinforced tire wherein a qualitative plurality of means is provided for securing steel reinforcement to the rubber of the tire. In the past, a number of attempts have been made to provide a practical means of reinforcing a tire against puncture by hard, sharp objects. A number of difficulties have arisen in developing these attempts. These difficulties comprise securing reinforcement of the tire in such a manner that the fixed relationship between metal reinforcement and the tire is preserved under dynamic loads in the field. Circumferential slippage between metal reinforcement and the rubber of the tire is common. This slippage, even when only minor movements are involved, accounts for unusual stresses in the metal reinforcement. Thus, if the reinforcement material is thin, this slippage causes bending moments on the metal above the fatigue limits for the size and alloy of that metal. On the other hand, if the reinforcing metal is too thick, while sufficient structural rigidity is present to carry unusual loads due to slippage, the ductility of the metal required lowers the fatigue limits of the stresses that can be applied to such metal. The ductility is required because of the cycling of alternate squeezing and relaxation of the tire between the wheel on which it is secured and the driving surface. Another problem with using thick metal reinforcement is the difficulty of manufacturing such an element and assembling into the reinforced tire product. Also, the weight of thick metal reinforcement lowers the driving performance of a vehicle to which it is applied. Another consideration in the use of thick metal reinforcement is the higher cost of using more metal to make a reinforced tire product.

Accordingly, it is an object of this invention to provide reinforcement of a tire against puncture by sharp objects, using a thin, high tensile strength sheet metal reinforcement that won't slip, is resilient to dynamic loading, and able to withstand entry of hard, sharp objects entering the tread from piercing the air cavity of the tire.

It is a further object of this invention to provide metal reinforcement for a tire shielding the air cavity from puncture and means for radial metal structural support of a portion of tread rubber to prevent blow outs due to tearing of rubber at the radial extremities of the tread.

A further object of this invention is to provide securing of reinforcing metal to rubber in the tire by indentations in the sheet metal into which tire rubber is pressed.

A still further object of this invention is to provide a method of making a reinforced tire to withstand puncture by hard, sharp objects that can be applied to either new or old tires.

A still further object of this invention is to provide a reinforced tire article and method of making same that is inexpensive, uncomplicated, and rapid.

These and other objects of this invention are achieved by using a thin sheet of high tensile strength stainless steel for reinforcing of the tire. Upstanding perpendicular brackets integral with the sheet are located at the axial edges of the sheet when the sheet is applied to the tire. These brackets extend radially outwardly from the sheet into portions of the tread near its axial surfaces. Rivets are secured to the sheet with shanks and heads extending radially outwardly therefrom into the tread rubber. Indentations in the sheet metal encompass tread rubber. Rubber gum adhesive secures both sides of the sheet to the tread and tire rubber.

Other objects of this invention will appear in the following description and appended claims, referring to the accompanying drawings forming a part of this specification.

ON THE DRAWINGS

Before explaining the present invention in detail, it is to be understood that the invention is not limited in its application to the details in construction and arrangement of parts illustrated in the accompanying drawings since the invention is capable of other embodiments and of being practiced or carried out in various ways.

Also, it is to be understood that the phraseology and terminology employed herein is for the purpose of description and not of limitation.

AS SHOWN ON THE DRAWINGS

Figure 1:
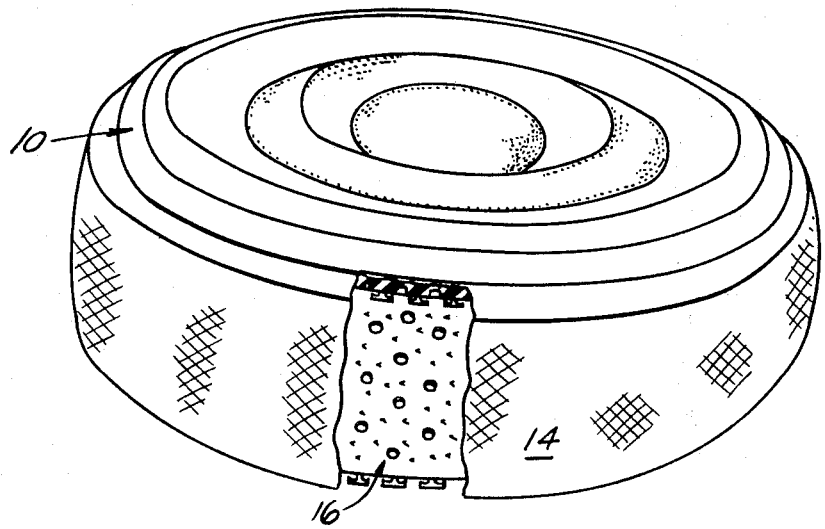
FIG. 1 shows a three dimensional elevated view of an axial side and radial periphery of a tire, with a partially cut out and sectional view, of the preferred embodiment of this invention.

The preferred embodiment of this invention is shown in FIG. 1. A tire 10 is shown. The preferred embodiment of the reinforcing means 16 is located between the tire air cavity and the tread 14.

Figure 2:
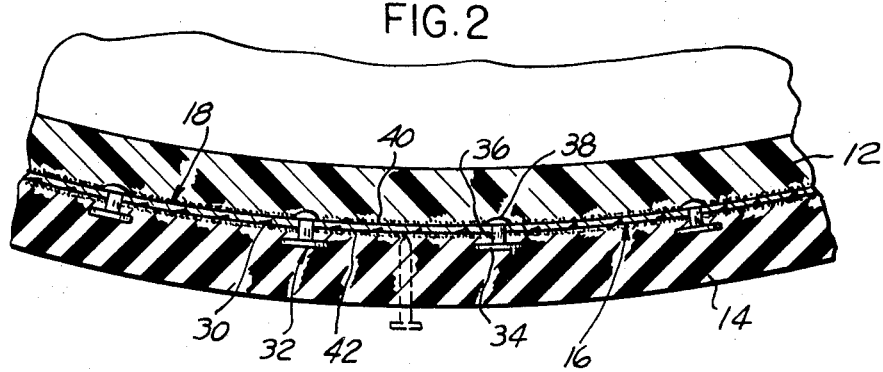
FIG. 2 is a partial radial section of the apparatus shown in FIG. 1.

Referring to FIG. 2, the radially interior portion of tire rubber 12 is on the interior circumferential side of the reinforcing means 16. The tread rubber portion 14 of the tire is shown on the radially exterior side of the reinforcing means 16.

Referring to FIGS. 2 through 5 collectively, the geometric configuration of the preferred embodiment of the reinforcing means 16 can be appreciated. A thin steel sheet 18 is formed in a circular annulus axially concentric with the axle of the wheel to which the tire is applied. In the preferred embodiment of this invention, this sheet 18 has a width approximately one-half of an inch less than the width of the tread in the radius at which the sheet is applied. This leaves approximately one-fourth of an inch of rubber between the axial extremities of the sheet and the axially exterior surface of the tread rubber. The sheet is made of high tensile strength stainless steel having a thickness of an order of magnitude corresponding to 1.5 millimeters.

At the axial extremities of the sheet 18, a plurality of upstanding perpendicular brackets, ledges or arms 22 are provided which extend radially outwardly from the sheet 18 into the tread rubber 14. The brackets 22 are substantially rectangular in shape but for 90° arcs 24 cut out near the juncture between the brackets and the sheet, resulting in a T shape. These brackets have the same thickness as the sheet 18 and are integral with the sheet. They may be formed by bending from the sheet. These brackets extend circumferentially around both axial edges of the sheet.

In spaces corresponding to interstices between the aforementioned brackets 26, a plurality of brackets 24 extend radially inwardly from the sheet. These brackets 26 are rectangular in shape. In other respects, the aforementioned comments on the description of the brackets 22 apply to the brackets 26. Both arrays of brackets 22 and 26 extend for a depth having an order of magnitude corresponding one-fourth of an inch.

Figure 3:
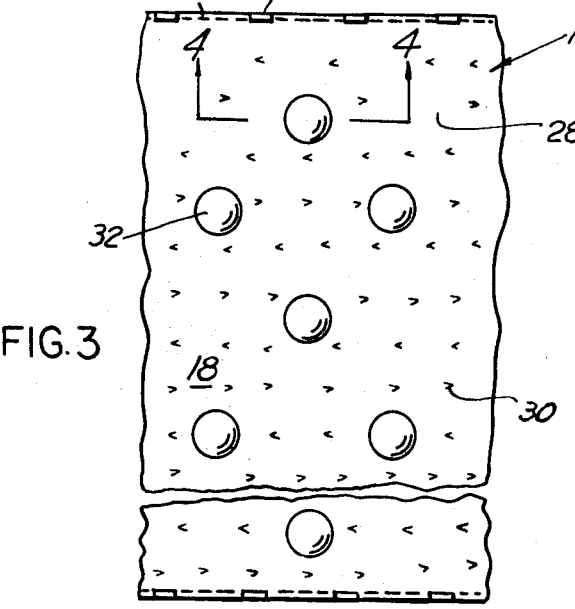
FIG. 3 is a radially outward view of a portion of metal reinforcement and securing means used in the apparatus shown in FIG. 1.
Figure 4:
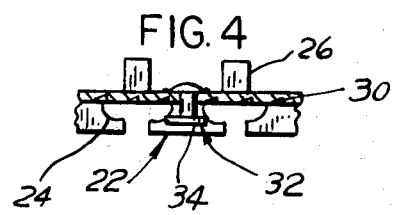
FIG. 4 is a cross-sectional view of the apparatus shown in FIG. 3 along the section lines 4—4.
Figure 5:
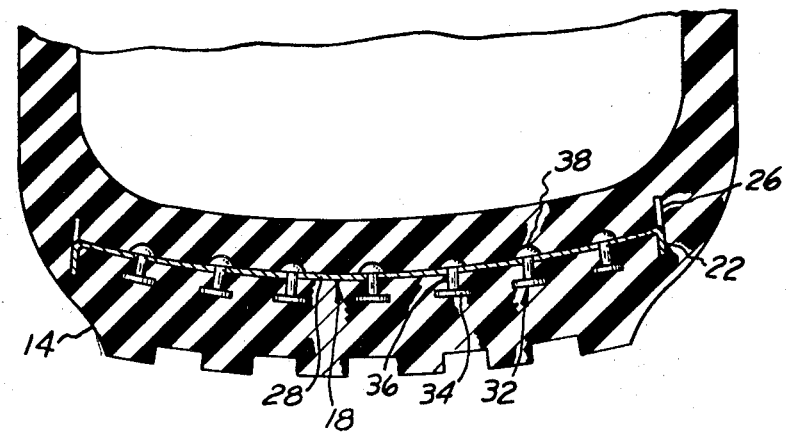
FIG. 5 is a cross-sectional view (axial sectional view) of a portion of the apparatus shown in FIG. 1.
Figure 6:
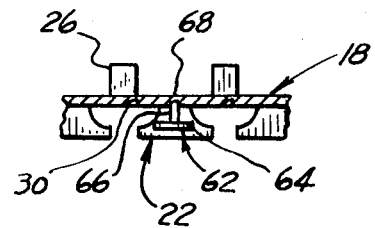
FIG. 6 shows an alternative embodiment of this invention and corresponds to the apparatus shown in FIG. 4.

On the radially outward surface 28 of the sheet 18, as shown in FIG. 3, a plurality of indentations 30 is shown. These indentations consist of circumferentially spaced arrows. The direction of one circumferential set of arrows going in one direction is adjacent to another set of circumferentially spaced arrows directed in the other direction. These indentations have triangular cross sections, as shown in FIG. 4, and extend to a depth corresponding to an order of magnitude of three-tenths of a millimeter.

The rivets 32 may be steel or brass.

A plurality of rivets 32 are provided on the sheet 18. These rivets are equally laterally spaced with respect to the sheet 18. The distances between the rivets correspond to an order of magnitude of three-fourths of an inch. The rivets 32 consist of a radially exterior head 34 attached to the radial extremity of a shank 36 extending from the radially outward side of sheet 18, and a rivet head 38 secured to the radially inward side 40 of the sheet 18. The rivet head 34 is flat and rivet head 38 is round or sectionally spherical in shape in its radially inwardly extending surface.

The rivet 32 is preferably secured to the sheet 18 by welding. The welds are preferably on the surface 40 of the sheet 18 connecting the rivet head 38 thereto.

Additional securing of the sheet 18 to the rubber 12 and 14 respectively is provided by the application of rubber gum or other rubber and metal adhesive on the surfaces 40 and 42 (radially outward surface of sheet 18) respectively.

In an alternative embodiment of this invention, rivets 62 are secured to the sheet 18 by spot welding. The rivets 62 comprise a flat head 64 extending radially outwardly into the tread of the tire which is attached to the radially outward extremity of a shank 66. The shank 66 extends into the sheet 18 after an electrode is applied on the radially inward side of the sheet 18 at a spot 68 corresponding to the location of the shank on the other side in the spot welding process.

In applying the aforementioned structure to a used tire, the below-described method is used. The tread 14 of the tire is stripped from the interior rubber 12 of the tire leaving a flat bald surface at the radial extremities of the interior tire portion 12. Reinforcing apparatus 16, with brackets 22 and 26 formed, indentations 30 previously applied, and rivets 32 or 62 attached, and rubber base gum or other rubber and metal adhering glue applied, is then circumferentially disposed in a snug fit to the interior rubber portion 12. The tread portion 14 is then applied to the radial extremity of the reinforcing structure 16.

Prior to this application, however, the tread portion 14 may be divided into strips fitting snugly between the axial interstices between the rivet shanks, or holes may be drilled in the rubber portion 14 that have a diameter smaller than the diameter of the rivet heads 34 or 64 and in corresponding spaced relation to the shanks of the rivets and then the tread portion 14 applied in a snug fit to the reinforcing structure 16.

In the operation of the above-described apparatus, it can be appreciated that large hard objects will be structurally resisted by the rivets as such objects pierce the tread rubber 14. If small hard objects pierce the tread rubber 14, they will be stopped from entry into the tire cavity either by the rivets or the sheet metal. It can also be appreciated from the foregoing description of the apparatus that should the tread rubber 14 wear down to the point where a portion of that rubber radial extremity is flush or nearly flush with the radial extremities of the rivet heads 34 or 64, the vehicle on which a reinforced tire of the above-described structure is applied will be riding on the rivet heads. If the vehicle is operated after this phenomenon for a period of time, metal structural reinforcement of the tire tread is provided by the above-described structure. In this manner, further tread wear is prevented for short driving distances to a place where the worn down tire can be repaired or replaced or recapped.

From the foregoing description of apparatus and method of preferred or alternative embodiment of this invention, it can be appreciated that a reinforced structure has been provided for a tire that resists punctures by sharp objects, either large or small, secured by a combination of means that resists slippage of sheet metal reinforcement with respect to tire rubber, is thin enough to be flexible with the flexing of a tire and yet strong enough to resist sheer and bending forces applied in dynamic loading conditions, is easy and inexpensive to manufacture and install, and has an uncomplicated design.

I claim:

1. In a reinforced tire article, the improvements comprising: a thin, high tensile strength sheet steel annulus fixed to and within the tread rubber of a tire, spaced away from the axial border surfaces of the tread rubber of the tire;

liquid adhesive means securing the tread rubber to the annulus; and rivets fixed to the annulus and extending into the tread rubber, toward but not breeching the tread in a radially outward direction from the center of the tire, the top and bottom of each of said rivets being embedded in tread rubber.

2. The article in claim 1, and brackets integral with the annulus and extending at an angle from the edge of the annulus into the tread rubber;

some of said brackets extending in a radially outward direction from the center of the tire toward but not breeching the radial outward extremity of the tread rubber; and said brackets spaced at a distance from the axial outer and radially outer extremities of the tread rubber.

3. The article in claim 1, and welds fixing said rivets to the annulus.

4. The article in claim 1, and spot welds fixing said rivets to the annulus.

5. The article in claim 1, and arc welds fixing said rivets to the annulus.

6. The article in claim 2 wherein a portion of said brackets extend radially outwardly from said annulus into the tread rubber.

7. The article in claim 2, wherein a portion of said brackets extend radially inwardly from the annulus into the tire rubber; said radially inwardly brackets spaced at a distance from the interior air cavity wall of the tire.

8. The article in claim 2, wherein a portion of said brackets extend radially outwardly from said annulus and another portion of said brackets extend radially inwardly from said brackets.

9. The article of claim 8, wherein said brackets extend circumferentially around the axial edges of said annulus such that alternative ones of said outwardly extending brackets are spaced at a radial distance from one another;

alternative ones of said inwardly extending brackets are spaced at a distance of one another; and said inwardly extending brackets are located in correspondence to the spaces between the outwardly extending brackets and the outwardly extending brackets are located in correspondence to spaces between said inwardly extending brackets.

10. The article in claim 6, wherein said outwardly extending brackets are T-shaped having the neck of the T connecting the cross of the T to the edge of the annulus.

11. The article of claim 10, wherein the edge of the T in the neck and lower portion of the cross is in the shape of 90° of a circular arc.

12. The article of claim 7, in which the shape of the racket is rectangular.

13. The article of claim 1 and indentations in the surface of the annulus encompassing rubber.

14. The article of claim 13, wherein said indentations are in the shape of an arrow circumferentially disposed around the annulus in parallel arrays;

the arrows in one array directed in a direction opposite from the direction of the arrows in an adjacent array.

15. The article of claim 1 and additional metal structural means extending radially outwardly from the annulus and encompassed with the tread rubber.

16. The article in claim 1, wherein the shanks of the rivets extend radially outwardly from the annulus.

17. The article in claim 16 and flat rivet heads integral with the rivet shanks at the radially outward extremity of the shanks.

18. The article of claim 16, wherein rivet heads have a radially interior extending surface of a spherical section and a radially exterior surface flush with the radially interior surface of the annulus.